Oct. 13, 1970     T. C. BOHRER ET AL     3,533,825
METHOD FOR CARBONIZING TEXTILES
Filed April 4, 1967
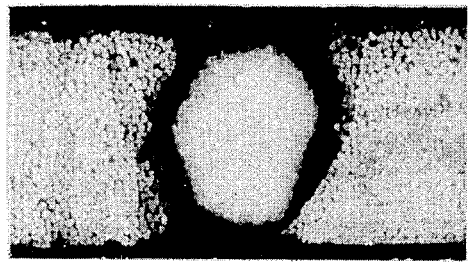
Inventors
Thomas C. Bohrer
George F. Ecker
BY C. B. Barris
Attorney United States Patent Office 3,533,825
Patented Oct. 13, 1970

3,533,825
METHOD FOR CARBONIZING TEXTILES
Thomas C. Bohrer, Madison, and George F. Ecker, Murray Hill, N.J., assignors to Celanese Corporation, New York, N.Y., a corporation of Delaware
Filed Apr. 4, 1967, Ser. No. 628,495
Int. Cl. B41c 1/06
U.S. Cl. 117—29                                      9 Claims

ABSTRACT OF THE DISCLOSURE

A process for imparting a durable carbon surface onto a textile, e.g., rayon, by applying to the textile a coating of polymeric material having a softening point below the softening point of the textile, e.g., a vinyl type polymer and contacting the coated textile with a moving gaseous atmosphere, e.g., air having carbon particles suspended therein. The gaseous atmosphere has a temperature above the softening point of the coating material and below the softening point of the textile material.

---

This invention relates to a method of treating textiles and other fibrous materials, and, more particularly relates to a method for applying a durable carbon surface to textiles and other fibrous materials and to the novel products resulting therefrom.

The term "textiles and other fibrous materials" as used herein, will be understood to include woven and knitted fabrics as well as felt and non-woven fabrics, paper and the like, yarns and threads, as well as loose fibers and the intermediate agglomerations of fibers produced in the course of the transformation of fibers into fabrics. The term will also be understood to cover fiber-forming materials of natural or synthetic origin.

Solids of an essentially porous nature, each with a decided affinity for the adsorption of certain vapors, have been developed for industrial use in the recovery of solvents, in fractionation of mixed gases, as well as in various other applications. The commercial materials include a variety of clays, chars, activated carbons, gels, alumina, silicates and the like. With most of these materials, a selective preference is shown for the adsorption of vapors. Generalizations, as to the adsorptive properties, however, are difficult and misleading inasmuch as adsorption is a function of the nature of the gas, temperature, pressure, the adsorbing solid, its activity, origin, method of preparation and previous history.

As mentioned, the adsorptive materials are more or less granular in form and are supported in beds or columns of suitable thickness through which the gas from which vapor is to be adsorbed may be passed. Inasmuch as the adsorbent is the crux of the adsorption system, which must be designed to some extent around the physical and chemical properties of the adsorbent, it would be advantageous to be able to provide the adsorbent in other than beds or columns of granular material. For example, a fiber or textile having a durable coating of adsorbent thereon would be advantageous for utility as gas resistant military fabrics, industrial filters, and the like.

It is, accordingly, an object of this invention to provide textiles and other fibrous materials having an adsorptive material thereon and to provide a method of producing same. It is a further object of this invention to provide textiles and other fibrous materials having a durable adsorptive carbon surface thereon and to a method of providing said surfaces. It is a still further object of this invention to provide textiles and other fibrous materials having durable adsorptive carbon surfaces thereon which materials would have strength combined with adsorptive properties and to a method of producing such materials.

Broadly, in accordance with the present invention, textiles and other fibrous materials are provided with a durable adsorptive carbon surface by applying to said textile a material, preferably polymeric, having a melting point lower than said textile material and contacting the treated textile with minute particles of carbon suspended in a moving gaseous atmosphere, said gaseous atmosphere being maintained at a temperature higher than the melting point of the coating material but lower than the melting point of the parent or precursor textile. One such method is by passing the treated textile through or over the upper portion of a luminous flame, e.g., an oxygen starved flame such as that produced by the burning of an organic fuel without sufficient oxygen for complete combustion. When a textile is treated in accordance with the present invention, a durable carbon surface is imparted to said textile; due both to deposition of carbon from the flame onto the heat softened coating and to partial carbonization of the coating and textile. It is important to note that only the outer surface of the textile is carbonized with the coating with the inner portion or core remaining essentially unchanged.

The textile materials which may be treated in accordance with this invention as hereinbefore mentioned, include woven and knit goods, also felt and other non-woven fabrics, threads, yarns, loose fibers, and other intermediate products obtained during manufacture of fabrics from fibers. These textile materials may consist of natural or synthetic fibrous material. Particularly favorable services are achieved in the treatment of fibers and fibrous materials consisting of acrylics, e.g., polyacrylonitrile and its copolymers, natural, regenerated and chemically modified cellulose, polyester resins, polyamides, polybenzamidazoles and the like. The preferred precursor materials are the acrylics and regenerated cellulose fibers, such as rayon.

Accordingly, non-limiting examples of the textiles which may be employed as precursor materials which can be treated by the process of this invention are fabrics, yarns etc. manufactured wholly or in mixtures with others of: cellulosics, e.g., cotton, rayon, etc., acrylics, e.g., long chain synthetic polymers composed of at least 85% by weight of acrylonitrile units, long chain synthetic polymers composed of less than 85% but at least 35% by weight of acrylonitrile units, etc.; cellulose diacetates; polyamides, e.g., nylon, etc.; polyesters, e.g., ethylene glycol-terephthalic acid condensation polymer, long chain synthetic polymers composed of at least 85% by weight of an ester of dihydric alcohol and terephthalic acid, etc., mineral fibers, e.g., glass, etc.; and the like.

In accordance with the invention, the textile material must have a suitable coating, e.g., of a low melting polymeric material, applied thereto prior to the carbon treatment. Broadly, any inert and, preferably volatile, liquid containing a suitable polymer can be employed to coat precursor textile material. Said liquid may be an aqueous dispersion or an organic solvent solution of the specified polymer. The liquids can contain widely varying amounts of polymer. The dispersions or solutions can contain the amounts and types of emulsifying, wetting, and/or dispersing agents that are usually employed in polymer compositions adopted for the production of surface coatings. The polymer can vary widely in molecular weight or degree of polymerization.

Preferably, the precursor textile material is coated with a vinyl-type polymer. The vinyl polymers of this type which are in commercial use and which are preferred in the present invention are polymers of vinyl acetate. Non-limiting examples of the polymers suitable for use herein include polymers of the vinyl esters and especially polymers of vinyl esters of saturated aliphatic monocarboxylic acid, e.g., vinyl acetate, vinyl propionate, vinyl butyrate, etc., vinyl and vinylidene halides, e.g., the vinyl and vinylidene chlorides, bromides and fluorides; polymers of allyl-type alcohols, e.g., allyl alcohol, methallyl alcohol, ethallyl alcohol, etc.; polymers of allyl, methallyl and other unsaturated monohydric alcohol esters of monobasic acids, e.g., allyl and methallyl acetates, laurates, cyanides, etc.; polymers of acrylic and alkacrylic acids( e.g., methacrylic, ethacrylic, etc.) and esters and amides of such acids (e.g., methyl, ethyl, propyl, butyl, etc., acrylates and methacrylates, acrylamide, methacrylamide, N-methyl, ethyl, propyl, butyl, etc., acrylamides and methacrylamides, etc.); low molecular weight polymers of methacrylonitrile, ethacrylonitrile and other hydrocarbon-substituted acrylonitriles; and the like, and mixtures thereof.

Generally, molecular weight (average molecular weight) of the homopolymeric or copolymeric material used to coat the precursor textiles of this invention is within the range of about 5000 to about 1,000,000 and, preferably, within the range of 500 to 500,000.

The molecular weight of the coating material is critical in that the softening point or melting point of same is usually related to same. For example in the instance of polyvinylacetate, a polymer composition having a molecular weight of about 5000 will flow at room temperature; a composition of 10,000 molecular weight has a softening point of about 65° C.; one of 30,000 molecular weight a softening point of about 110° C., and; a composition of 500,000 a softening point of about 230° C. Thus, a polyvinylacetate of 500,000 (230° C. soft. pt.) would not be employed to coat a polypropylene fiber having a softening point of about 160° C. Obviously a much lower weight coating material would be employed, e.g. a polyvinylacetate of 30,000 molecular weight (soft. pt. 110° C.).

The coating material employed can be applied by any of the accepted procedures used in coating fibers fabrics, and other shaped articles. This includes padding, dipping, brushing, spraying, roll transfer, spreading, etc. They can be applied either in single or in multiple layers, if desired. The amount of material deposited on the textile material (based on the weight of applied polymer) can vary between 1% to 100% and higher, said percentage being based on the textile materials' weight, A preferred amount is approximately between 5 to 25, i.e. the amount of polymer applied is such as to increase the weight of the textile by about 5% to 25% based on the dry weight of the textile.

If desired, after the liquid polymeric material has been applied, the textile material carrying such coating may be dried by any conventional manner such as by radiant drying, convection drying, conduction drying, dielectric drying, etc. Drying can be effected at temperatures of from 200° F. to 500° F. for a time period sufficient to effect removal of substantially all the solvent. After this drying treatment the textile is ready for the flame treatment of the present invention.

In accordance with the broad aspects of the invention the textile material is coated with a polymeric material which must necessarily soften and melt at a temperature below that of the parent or precursor textile polymer. The thus-coated textile is then subjected to a moving gaseous atmosphere, e.g., an air current, in which activated carbon, e.g., soot, is supended. In this manner the suspended particles can impinge in a steady and controlled stream on the softened, melted, or pyrolyzed coating on the textile surface. It is imperative that the temperature of the area surrounding the coated textile be maintained above the softening or melting point of the coating but below that of the parent textile polymer material.

In accordance with a preferred embodiment of the invention, a coated yarn is passed over or through the upper portion of a luminous flame to produce the desired adsorbtive carbon surface. Such flame may be characterized as being an oxygen-starved, luminous flame.

The fuel employed to produce such flame could suitably be any combustible liquid or gas. Non-limiting examples include fuel oil, benzene, gasoline, kerosene, methane, propane, acetylene and the like. An unsaturated hydrocarbon fuel is more preferable than a saturated hydrocarbon in that such fuel results in a more sooty flame. The critical factor is, however, the provision of oxygen starvation so as to produce a luminous, e.g., orange and thereby a sooty flame.

The manner of directing the suspended carbon particles is one of experience and is within the bounds of normal experimentation, e.g., a manifold may be employed. Similarly the temperature of the atmosphere can be varied conventionally, e.g., the position of the textile workpiece can be raised or lowered over the flame, if one is employed, and the temperature is controlled by such variation.

An aspect of the invention is illustrated in FIG. 1 which is a photomicrograph (enlarged 100 times) of the cross section of a viscose rayon yarn which had been coated with a polyvinyl acetate emulsion, i.e., polyvinyl acetate having a molecular weight of about 5000. Said figure represents a yarn which has been passed through the upper portion of a luminous flame, i.e., as produced by burning propane without sufficient oxygen for complete combustion. The dark peripheral area of the filament represents a durable carbon surface which has been imparted to the filament due both to deposition of carbon from the flame onto the softened coating, i.e., polyvinyl acetate and also to partial carbonizatiton of the coating and peripheral filaments per se. It is to be noted that the carbonized portion is characterized as a surface and that the inner area of the filament has not been carbonized. Generally, the carbonized portion will represent from about 5 to 50% of filament cross sectional area.

The following represents a preferred embodiment of the process of the present invention. In this embodiment, an acrylic yarn of 220 denier, having an elongation of about 21%, a tenacity of 3.26 grams per denier and a modulus of 54.2 is subjected to the technique of this invention at a speed of about 4.5 meters per minute. The yarn is unwound from suitable supply means and by means of suitable guides is passed through a tension gate and into a size bath so as to suitably coat the yarn while under tension. The size bath contains a 10 percent emulsion of a polyvinyl acetate having a molecular weight of about 5000. Said bath is maintained at a temperature of about 250° C. After removing excess material, the polymer coating is dried, preferably by means of a plurality, e.g., four, electric ovens which are maintained at a temperature of about 100° C. After drying, the thus-coated yarn is passed through a series of propane flames in accordance with the invention. Preferably, said flames are directed through funnel-like means so as to direct and maintain said flame in the area of the yarn and to carefully control the amount of $O_2$ available for combustion. In this embodiment, that portion of the flame through which the yarn is passed is at a temperature of about 250° C.

Preferably, a manifold or a hood of suitable material is positioned above the yarn and the flames so as to insure an even carbonization of the yarn being passed through said flames. After carbonization, the yarn is passed to suitable take-up means. In accordance with the objects of the invention, the resulting durable carbon surface applied on the yarn exhibits the associated characteristics of carbon while the parent or precursor yarn retains essentially most of its tensile properties.

Obviously, many modifications and variations of the present invention are possible in the light of the above teachings. It is, therefore, to be understood that within the scope of the appended claims, invention may be practiced otherwise as specifically described.

The embodiments of the invention in which an exclusive property or privilege is claimed are defined as follows:

1. A process for imparting a durable carbon surface onto a textile which comprises: applying to said textile a coating of polymeric material and positioning the coated textile above the upper portion of luminous flame such that (1) the temperature adjacent said coated textile is sufficient to partially carbonize the coating and outer surface of said textile and (2) carbon from said flame is deposited upon said partially carbonized coating.

2. The process of claim 1 wherein said textile is comprised of an acrylic polymer.

3. The process of claim 1 wherein said textile is comprised of rayon.

4. The process of claim 1 wherein said polymeric coating material is a vinyl-type polymer.

5. The process of claim 4 wherein said vinyl-type polymer is a vinyl acetate polymer having a molecular weight of from about 5000 to about 1,000,000.

6. The process of claim 1 wherein said flame results from the combustion of an organic fuel without sufficient oxygen for complete combustion.

7. The process of claim 6 wherein said organic fuel is propane.

8. A process for imparting a durable carbon surface onto a filamentary material while retaining most of the tensile properties of said material which comprises passing said filamentary material through a bath containing a vinyl-type polymer so as to coat said filamentary material, passing said coated material through drying means maintained at from about 25° C. to 300° C. and passing the dried, coated filamentary material over the upper portion of a luminous flame, said portion being maintained at a temperature sufficient to partially carbonize the coating and outer surface of said textile and deposit carbon from said luminous flame upon said partially carbonized surface.

9. The process of claim 8 wherein said polymeric material is polyvinyl acetate having a molecular weight of from about 5,000 to 500,000.

References Cited

UNITED STATES PATENTS

| 3,015,367 | 1/1962 | Smith et al. | 55—524 XR |
| 3,029,166 | 4/1962 | Hainsworth et al. | 117—29 XR |

FOREIGN PATENTS 770,524  3/1957  Great Britain.

OTHER REFERENCES

German printed application 1,155,835, pub. date October 1963.

DAVID KLEIN, Primary Examiner

U.S. Cl. X.R.

55—524; 117—46, 76, 216, 226

UNITED STATES PATENT OFFICE
CERTIFICATE OF CORRECTION

Patent No. 3,533,825          Dated October 13, 1970

Inventor(s) Thomas C. Bohrer and George F. Ecker

It is certified that error appears in the above-identified patent and that said Letters Patent are hereby corrected as shown below:

Col 3, line 20: delete "500", insert ---5000---.

SIGNED AND SEALED
DEC 8 1970

(SEAL)
Attest:

Edward M. Fletcher, Jr.
Attesting Officer

WILLIAM E. SCHUYLER, JR.
Commissioner of Patents